(12) United States Patent
Aboczky

(10) Patent No.: US 6,766,609 B1
(45) Date of Patent: Jul. 27, 2004

(54) COMBINED FISH SCALE AND CATCH-AND-RELEASE DEVICE

(75) Inventor: Robert Aboczky, Upper Saddle River, NJ (US)

(73) Assignee: Abori, Inc., Garfield, NJ (US)

( * ) Notice: Subject to any disclaimer, the term of this patent is extended or adjusted under 35 U.S.C. 154(b) by 0 days.

(21) Appl. No.: 10/225,056

(22) Filed: Aug. 21, 2002

Related U.S. Application Data

(63) Continuation-in-part of application No. 09/546,123, filed on Apr. 10, 2000, now Pat. No. 6,438,891.

(51) Int. Cl.[7] ............................................. A01K 97/00
(52) U.S. Cl. ........................................... 43/53.5; 43/5
(58) Field of Search ...................... 43/4, 5, 53.5; 7/106; 33/511; 177/129, 148, 232, 233; 73/862.474, 426

(56) References Cited

U.S. PATENT DOCUMENTS

| | | | |
|---|---|---|---|
| 268,950 A | 12/1882 | Simkins | 294/22 |
| 465,222 A | 12/1891 | Ulbricht | 294/22 |
| 704,692 A | 7/1902 | Beider | 294/22 |
| 747,376 A | 12/1903 | Christsman | 294/22 |
| 960,070 A | 5/1910 | Brown | 294/22 |
| 1,087,649 A | 2/1914 | Fournet | 294/22 |
| 1,120,735 A | 12/1914 | Moyer | 294/22 |
| 1,124,207 A | 1/1915 | Bujese | 294/22 |
| 1,180,764 A | 4/1916 | Derbits | 294/22 |
| 1,328,860 A | 1/1920 | Walsh | 294/22 |
| 1,337,398 A | 4/1920 | Fleckner | 294/22 |
| 1,453,301 A | 5/1923 | Winkler | 294/22 |
| 1,464,232 A * | 8/1923 | Beam | 177/233 |
| 1,759,524 A | 5/1930 | Smith | 294/22 |
| 1,916,866 A | 7/1933 | Porter | 294/22 |
| 2,575,638 A | 11/1951 | Price | 294/22 |
| 2,836,004 A | 5/1958 | Stader | 43/53.5 |
| 3,514,892 A | 6/1970 | Wormsbecker | 43/53.5 |
| 3,714,732 A | 2/1973 | Little | 43/53.5 |
| 4,682,716 A | 7/1987 | Morellini | 222/529 |
| 5,119,585 A | 6/1992 | Camp | 43/53.5 |
| 6,314,654 B1 * | 11/2001 | Morissette | 33/511 |
| 6,438,891 B1 | 8/2002 | Aboczky | 43/53.5 |
| 6,560,913 B1 * | 5/2003 | Liao | 43/5 |

* cited by examiner

Primary Examiner—Kurt Rowan
(74) Attorney, Agent, or Firm—Siegmar Silber, Esq.

(57) ABSTRACT

A combined fish scale and catch-and-release device is disclosed. The catch-and-release device hereof has a unique crank and slider mechanism with a self-locking function independent of external resistance, which mechanism reciprocally drives the opposing C-shaped jaws between an open position and a closed position. The closed position is self-locking. The device is housed in an elongated body having a handle at one end from which the crank is operated. The handle has a spring scale housed therein with a scale stem extending from the handle. The spring scale has a separate handle adjacent the catch-and-release handle enabling the user to move between lip-locking and weighing modes without touching the fish. During weighing the fish and the device are suspended from the scale handle and the spring of the scale is compressed, exposing scale markings indicating the weight.

20 Claims, 3 Drawing Sheets

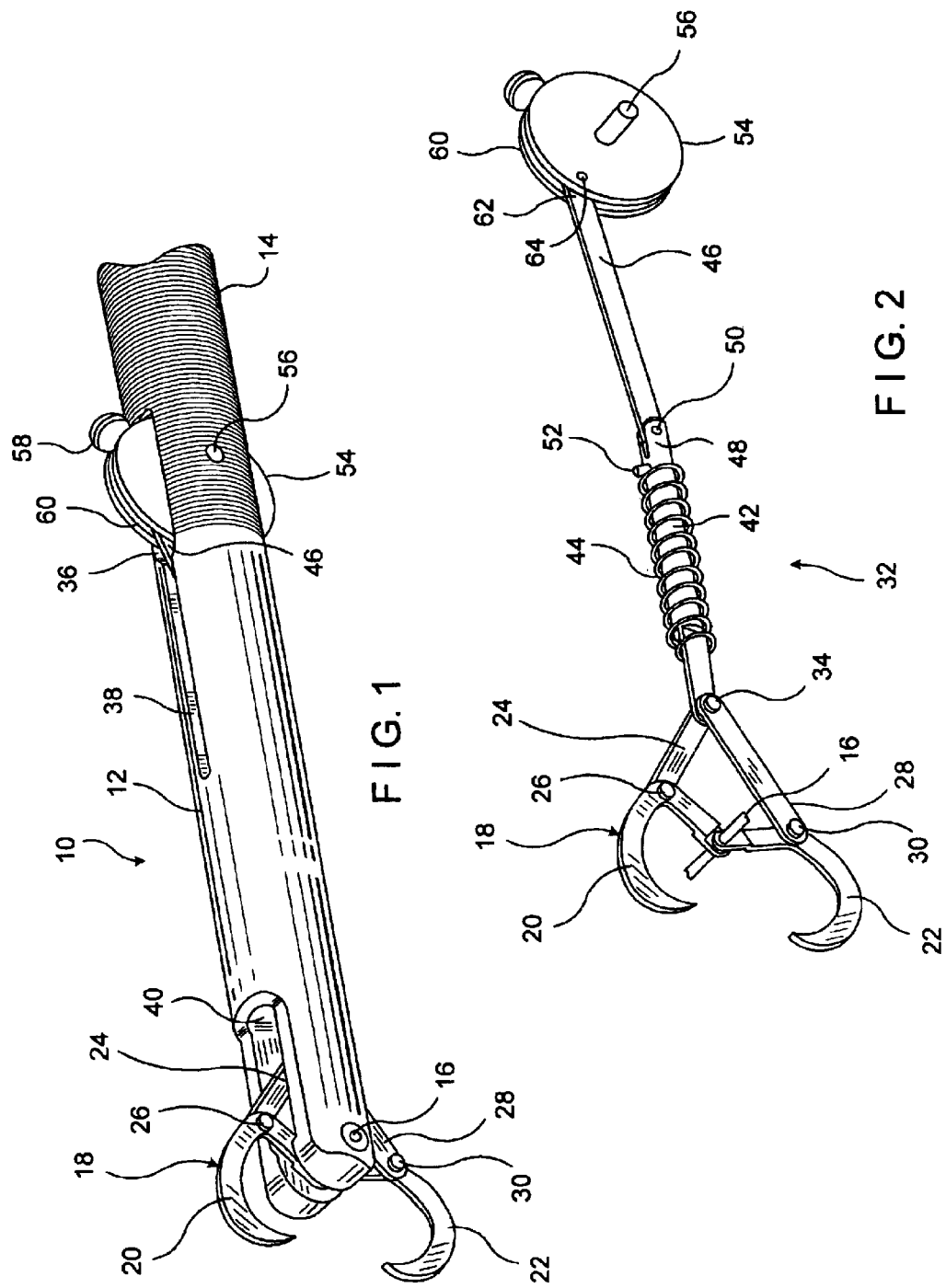

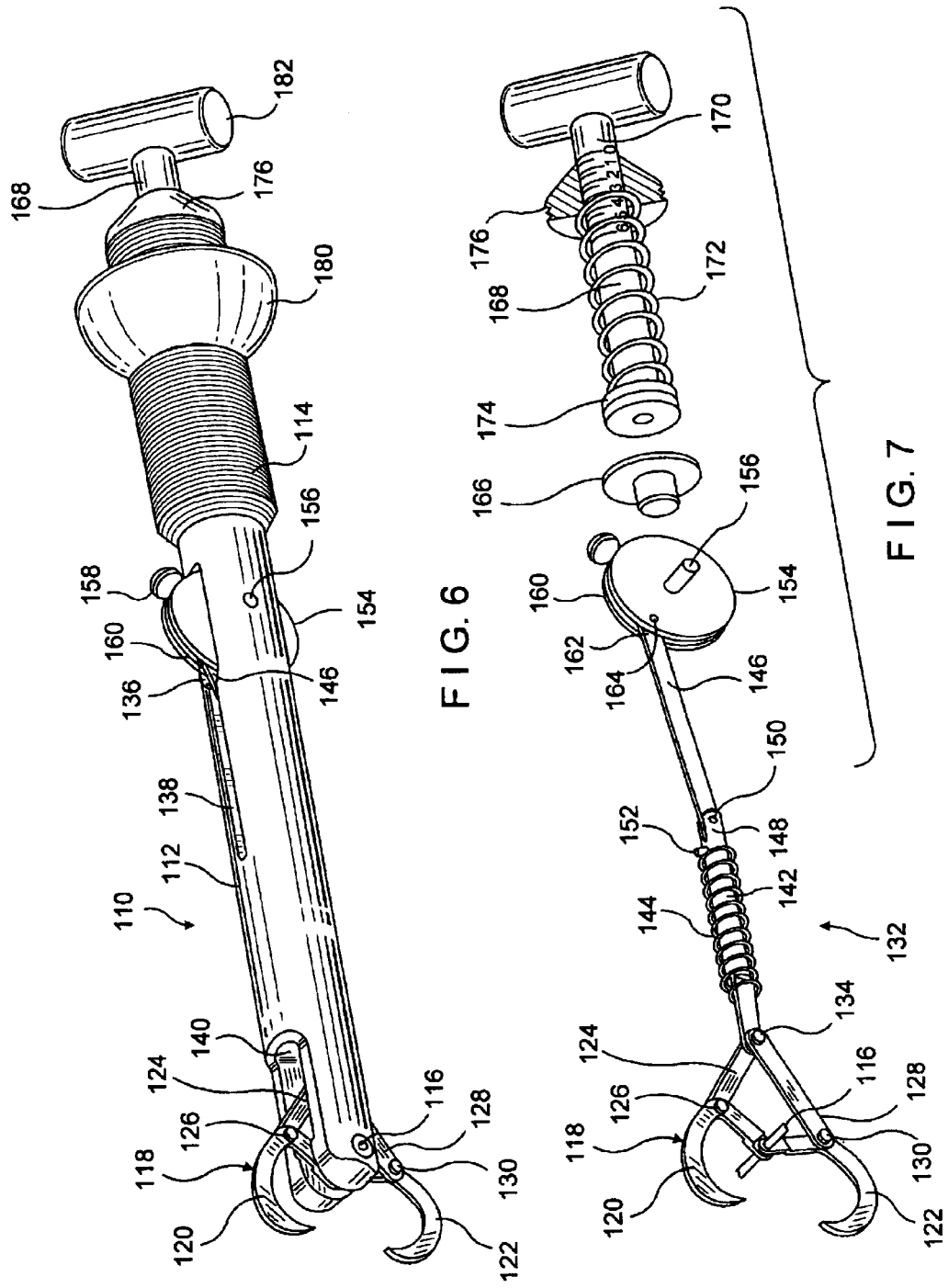

COMBINED FISH SCALE AND CATCH-AND-RELEASE DEVICE

RELATED APPLICATION

This application is a continuation-in-part of application Ser. No. 09/546,123, filed Apr. 10, 2000, entitled Catch-and-Release Device, now U.S. Pat. No. 6,438,891, issued Aug. 27, 2002.

BACKGROUND OF THE INVENTION

1. Field of the Invention

This invention relates to a combined fish scale and catch-and-release device to enable a fisherman to securely grip a fish by the lower lip during the release procedure. Further, the combined fish scale and catch-and-release device reduces the injury to the fish by minimizing the handling of the fish during weighing and the handling of the fish in the release process. In so doing, the natural protective coating of the fish is preserved and the survival rate upon release is optimized.

2. Description of the Prior Art

Today's sport fishing regulations have evolved so that more and more fisherman are required to catch and release a larger proportion of the fish caught. This is designed to maintain fish and stream environments and to provide, where a particular species needs protection, the necessary level of intervention.

While these regulations did not meet initially with universal acceptance, the catch-and-release mode is now sufficiently integrated into sport fishing that equipment facilitating the procedures is more widely available. For example, the fish handling tool of C. D. Camp, described in U.S. Pat. No. 5,119,585 has been introduced to the market. This prior art device provides a fish handling device in which the gripping pressure of the jaws is increased by the weight of the fish.

When operating in the catch-and-release mode, it is of key importance that the handling of fish caught on the line be in a manner that is least harmful to the fish. Minimally a gripping device is needed which is easy to handle with one hand so that the other hand is free to disengage the fishhook. Such gripping devices nip the lip of the fish between two jaws operating between an open and a closed position.

In the prior art resistance-dependent mechanism, there is a greater possibility of damage to an active fish than there is with a gripping mechanism that is independent of external resistance. With a relaxed fish, there is more likelihood with the prior art device that the resistance to the gripping mechanism is below the level required for self-locking operation. This, in turn, leads to premature release of the fish.

The device of the present invention, as will be seen from the description which follows, overcomes the problems created by a resistance-dependent, self-locking mechanism and exhibits the advantages provided hereinbelow.

SUMMARY OF THE INVENTION

The invention disclosed herein is a catch-and-release device that has a unique mechanism with a self-locking function independent of external resistance. The catch-and-release device hereof has opposing C-shaped jaws that are reciprocally driven between an open position and a closed position by a crank and slider assembly. The crank of the crank and slider assembly rotates approximately 90° in one direction during closing and locking and rotates approximately 90° in the opposite direction during unlocking and opening. The crank arm of the crank and slider assembly is at one end eccentrically mounted to the crank and at the other end flexibly mounted to a reciprocating slider which, in turn, is attached at the other end thereof to the operating arms of the jaws.

The crank arm during the rotation of the crank (in either direction) reaches a position or null point wherein the longitudinal axes of the crank arm and the reciprocating slider are aligned. A spring is secured to the crank and slider assembly that biases the crank arm toward the crank. The spring force with the crank rotating in the direction of closing and locking is initially exerted counter to the closing effort. When this force is overcome and the null point is passed, the spring force is then exerted in the opposite direction and maintains the locking position. Conversely, the spring force with the crank rotating in the direction of opening and unlocking is initially exerted counter to the unlocking effort. When this force is overcome and the null point is passed, the spring force is exerted in the opposite direction to maintain the jaws in an open condition.

The crank and slider assembly is mounted in an elongated or tubular body having a handle portion at one end thereof. Adjacent the handle, a crank slot accommodates the crank on an axis transverse to that of the elongated body. The crank slot also provides limits restricting the rotatory motion of the crank to the approximately 90° of rotation described supra. Adjacent the crank slot, the tubular body has on one side thereof a crank arm relief slot which receives the misaligned crank arm when the eccentric mounting point is rotated beyond the null point to the same side of tubular body. As the wall of the tubular body opposite the relief slot is intact, upon the crank arm being misaligned in the opposite direction as just described, the wall acts as a stop or lock with the spring retaining the crank arm in the locked condition.

In the second embodiment, the handle is enlarged to accommodate therewithin a spring scale. The handle portion has the dual function of handle for the catch-and-release device and outer housing of the spring scale. The fish scale operates independently from the catch-and-release function, and, during engagement with the lip of the fish, no forces are exerted upon the spring of the scale. After locking onto the fish, the fish and the catch-and-release device are suspended from the scale handle and the spring of the scale is compressed, exposing on the scale shaft calibrated markings indicating the weight of the fish.

OBJECTS AND FEATURES OF THE INVENTION

An object of the present invention is to provide a catch-and-release device which combines a unique self-locking mechanism with a pair of gripping jaws enabling the fisherman to nip the lower lip of a fish by a simple one-handed operation and upon detaching the fish hook from a fish releasing the fish to his environment.

Another object of the invention is to provide a fish gripping tool which is easy to manufacture and can be made in various lengths for differing applications, e.g. fishing from a riverbank and fishing from a boat.

A further object of the invention is to provide a catch-and-release device which is easy to lock onto the lower lip of the fish and is easy to release the locking mechanism thereof, which device ensures minimal handling by the fisherman of the fish and without interfering with the exterior coating of the fish.

A yet further object of the invention is to provide a fish scale within the handle of the catch-and-release device that operates independently therefrom.

A feature of the present invention is that the crank arm, when positioned on one side of the longitudinal axis, is biased toward the open position; and on the other side, toward the closed position.

This together with other objects and advantages will become apparent in the description which follows.

BRIEF DESCRIPTION OF THE DRAWINGS

Throughout the drawings which follow, the same reference designators are used for the same parts.

FIG. 1 is a perspective view of catch-and-release device of the present invention;

FIG. 2 is a perspective view of the crank and slider assembly of FIG. 1;

FIG. 6 is a perspective view of a second embodiment of the combined fish scale and catch-and-release device of the present invention, similar to FIG. 1, but including a spring scale therewithin; and, FIG. 7 is a perspective view of the crank and slider assembly and the spring scale of FIG. 6.

DESCRIPTION OF THE PREFERRED EMBODIMENT

Figure 3:
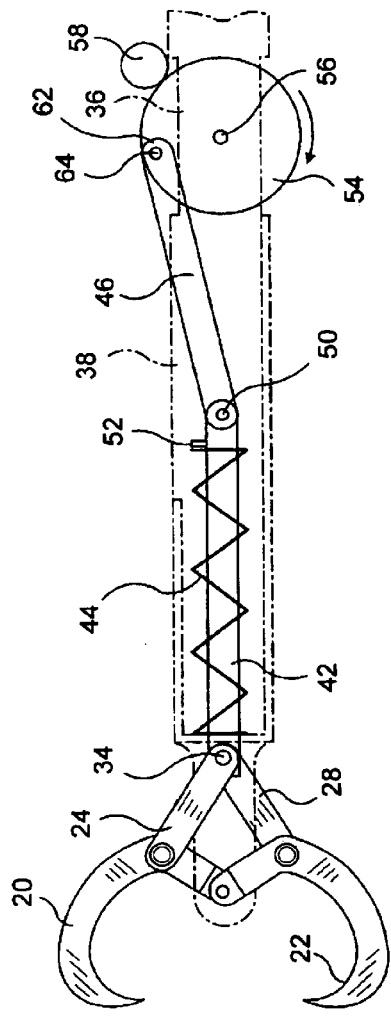
FIG. 3 is a schematic diagram showing the operation of the fish gripping device of FIG. 1 and illustrates the device in the open position.

A catch-and-release device of this invention is for holding the lip of a fish while removing the fishhook from the fish. The device has an elongated body with a longitudinal axis therethrough. The body has a handle portion at one end, a central bore open at one end and coaxial with the longitudinal axis, and a fixed pivot in the open end of the bore. The device includes a pair of C-shaped jaws, each of which is attached at one end thereof to the fixed pivot and rotatable thereabout. Upon rotation, the jaws operate between a closed position with the unattached end of the jaws meeting and an open position for accepting the lip of a fish. A pair of operating arms, for rotating the jaws about the fixed pivot, are each attached at one end thereof to a point medial the ends of a C-shaped jaw.

A crank and slider assembly is mounted in the central bore and attached at one end by a movable pivot to the operating arms. The crank and slider assembly has a crank with a crank arm eccentrically mounted thereto. The crank arm translates a rotational crank movement to a linear forward movement and translates a counter rotational crank movement to a linear rearward movement. The crank arm opens the C-shaped jaws upon forward movement and locks the C-shaped jaws upon rearward movement. A spring is mounted between the slider and the interior wall of the elongated body, which spring is biased toward the handle portion. This provides a spring force against opening of the device and toward locking of the device.

Referring now to FIGS. 1 and 2, this disclosure is of a catch-and-release device, generally indicated by the reference numeral 10. The device is designed to securely hold the lip of a fish to aid the angler in landing the fish or in holding the fish while fishhooks are removed and the release of the fish is effectuated. The catch-and-release device 10 is constructed with an elongated, cylindrical body 12 with a handle portion 14 at one hand and a fixed, gripping jaw pivot 16 at the opposite end thereof. Mounted at the pivot end of the handle, an articulated gripping jaw assembly 18 is constructed with two C-shaped jaw portions 20 and 22. The jaws 20 and 22 are mounted coplanar to one another so that the open portions of the "C" shapes are facing each other. The two jaws 20 and 22 are attached at one end thereof to the fixed pivot 16 and are operable between an open end and a closed position.

To the gripping jaw 20 and, medial the ends thereof, an operating arm 24 is attached at radial pivot 26. Similarly, gripping jaw 22 is attached to operating arm 28 at radial pivot 30. The crank and slider assembly 32, described in detail below, is attached to operating arms 24 and 28 by movable pivot 34. The mechanical arrangement is such that the reciprocation of the crank and slider assembly 32 is translated from a linear motion at the movable pivot 34 to an arcuate motion at radial pivots 26 and 30. The radius of the arcuate motion for gripping jaw 20 is from the center of fixed pivot 16 to the center of radial pivot 26; and, for gripping jaw 22, from the center of fixed pivot 16 to the center of the radial pivot 30.

The reciprocation drive and locking mechanism is next discussed. The elongated body 12 is configured to house the crank and slider assembly 32 by having a crank'slot 36 therethrough, a crank arm relief slot 38 through one side of the body, and a central bore 40 extending from the fixed pivot end of the body to the crank slot 36. The crank and slider assembly 32 is constructed to extend from the movable pivot 34 by having a spring-loaded reciprocating slider 42 fitted in the central bore 40 and being substantially coaxial therewith. Spring 44 is mounted around the slider 42 and is structured to urge the assembly 32 rearward toward handle portion 14 and to provide locking as described below.

At the end of the reciprocating slider 42 opposite the movable pivot 34, a crank arm 46 is joined thereto by a knuckle joint 48 and crank arm pin 50. A spring retaining fitting 52 is mounted on the slider 42 adjacent joint 48. A crank 54 is mounted to the elongated body 12 by a crank pin 56 at crank slot 36. A crank handle 58 is attached to the periphery of the disk for the purpose of operating the crank and slider assembly 32 in a reciprocating motion back and forth in central bore 40. The crank slot 36, in the embodiment shown, limits the crank action to an approximate 90 degrees of rotation. The crank 54 includes a centrally placed cavity 60 which is constructed to receive end 62 of the crank arm 46. This end 62 is the end opposite the knuckle joint 48 and end 62 is attached to the crank 54 by crank arm pin 64.

Figure 4:
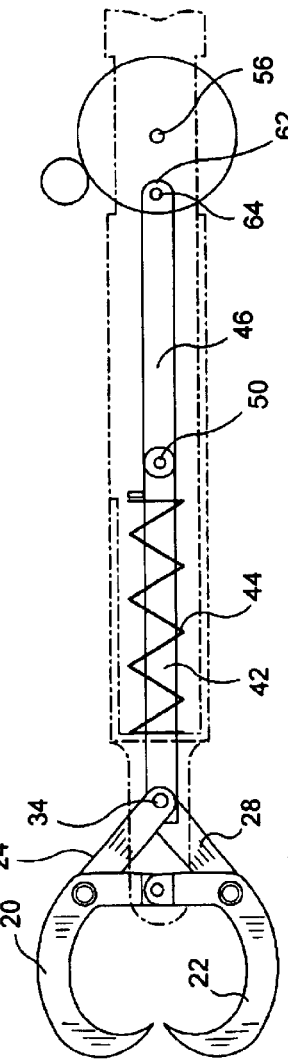
FIG. 4 is a schematic diagram, similar to FIG. 3, but illustrating the device in the null position.
Figure 5:
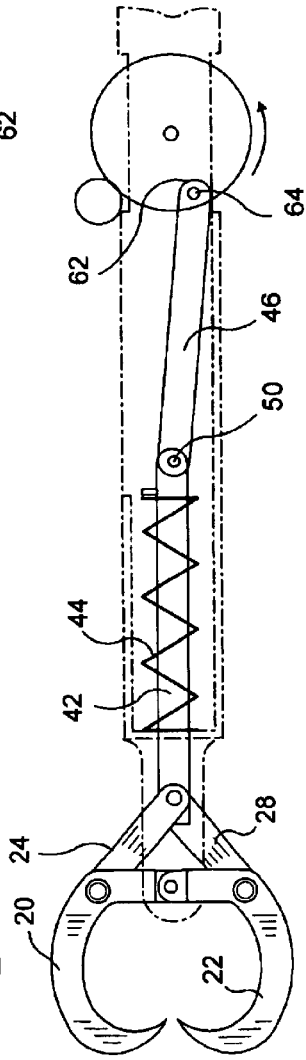
FIG. 5 is a schematic diagram similar to FIG. 3, but illustrating the device in the locked position.

The catch-and-release device, shown in FIGS. 3 through 5 of this invention, is now discussed in relation to the preferred embodiment described above. It is realized that slight changes such as moving the crank handle 58 to a position 180° about the periphery of the crank 54 would alter the operating description, but not the underlying mechanical working of the device. In the present device, with the crank handle 58 rotated rearwardly (that is away from the gripping jaws 20 and 22), the spring 44 extends moving the slider 42 rearward and causing operating arms 24 and 28 to move radial pivots 26 and 30 on an arcuate pathway opening the gripping jaw assembly 18 to the fully open position (limited by the structural stop described supra).

Simultaneously the end 62 of crank arm 46 is at rest in crank arm relief slot 38 and cavity 60, FIG. 1, of crank 54, FIG. 3. As the crank handle 58 is rotated forwardly (that is toward the gripping jaws 20 and 22), the spring 44 compresses moving the slider 42 forward and causing operating arms 24 and 28 to move radial pivots 26 and 30 on an arcuate pathway closing the gripping jaw assembly 18. If the forward motion of the crank handle 58 is considered counterclockwise, initially the spring 44 provides an opposite clockwise force. As the crank arm 46 and slider 42 come into alignment a null point is reached, FIG. 4.

Upon further forward motion of the crank handle 58 continuation beyond the null point, the spring 44 provides a counterclockwise force urging the end 62 of crank arm 46 into a locked position. The locked position of the crank arm 46 entraps the end 62 between the walls of central bore 40 and cavity 60 and holds the end 62 by the counterclockwise force from spring 44. Upon unlocking, the crank handle 58 is moved counterclockwise until the null point is reached. The spring 44 forces then change to clockwise and urges the gripping device to a fully open condition.

In the combined fish scale and catch-and-release device of the second embodiment, similar parts of the embodiment are provided with reference designators "100" units higher than those in the first embodiment. Thus, the crank arm relief slot 138 of this embodiment is analogous to crank arm relief slot 38 of the first embodiment.

Referring now to FIGS. 6 and 7, a second embodiment is of a combined fish scale and catch-and-release device, generally indicated by the reference numeral 110. The device is designed to securely hold the lip of a fish to aid the angler in landing the fish, to hold the fish during the weighing thereof and while fishhooks are removed, and to hold the fish during the release process. The catch-and-release device 110 is constructed with an elongated, cylindrical body 112 with a handle portion 114 at one end and a fixed, gripping jaw pivot 116 at the opposite end thereof. Mounted at the pivot end of the handle, an articulated gripping jaw assembly 118 is constructed with two C-shaped jaw portions 120 and 122. The jaws 120 and 122 are mounted coplanar to one another so that the open portions of the "C" shapes are facing each other. The two jaws 120 and 122 are attached at one end thereof to the fixed pivot 116 and are operable between an open end and a closed position.

To the gripping jaw 120 and, medial the ends thereof, an operating arm 124 is attached at radial pivot 126. Similarly, gripping jaw 122 is attached to operating arm 128 at radial pivot 130. The crank and slider assembly 132 is attached to operating arms 124 and 128 by movable pivot 134. The mechanical arrangement is such that the reciprocation of the crank and slider assembly 132 is translated from a linear motion at the movable pivot 134 to an arcuate motion at radial pivots 126 and 130. The radius of the arcuate motion for gripping jaw 120 is from the center of fixed pivot 116 to the center of radial pivot 126; and, for gripping jaw 122, from the center of fixed pivot 116 to the center of the radial pivot 130.

The reciprocating drive and locking mechanism is next discussed. In a manner similar to the first embodiment, the elongated body 112 is configured to house the crank and slider assembly 132 by having a crank slot 136 therethrough, a crank arm relief slot 138 through one side of the body, and a central bore 140 extending from the fixed pivot end of the body to the crank slot 136. The crank and slider assembly 132 is constructed to extend from the movable pivot 134 by having a spring-loaded reciprocating slider 142 fitted in the central bore 140 and being substantially coaxial therewith. Spring 144 is mounted around the slider 142 and is structured to urge the assembly 132 rearward toward handle portion 114 and to provide locking as described below.

At the end of the reciprocating slider 142 opposite the movable pivot 134, a crank arm 146 is joined thereto by a knuckle joint 148 and crank arm pin 150. A spring retaining fitting 152 is mounted on the slider 142 adjacent joint 148. A crank 154 is mounted to the elongated body 112 by a crank pin 156 at crank slot 136. A crank handle 158 is attached to the periphery of the disk for the purpose of operating the crank and slider assembly 132 in a reciprocating motion back and forth in central bore 140. The crank slot 136, in the embodiment shown, limits the crank action to an approximate 190 degrees of rotation. The crank 154 includes a centrally placed cavity 160 which is constructed to receive end 162 of the crank arm 146. This end 162 is the end opposite the knuckle joint 148 and end 162 is attached to the crank 154 by crank arm pin 164.

The central bore 140 enlarges upon extending through cylindrical body 112 to handle portion 114. The handle 114 also serves as the fish scale housing. Isolating the portion of the central bore 140 that houses the crank and slider assembly 132 is a plug 166. The plug 166 forms a water tight seal between the two portions of the central bore 140. The fish scale housing 114 receives therewithin a scale stem 168 having markings 170 thereon. About the scale stem 168 is disposed scale spring 172 secured between spring retainer or locknuts 174 and an indicator cap 176. The indicator cap 176 threadingly engages the open end 178 of handle 114. The markings 170 are calibrated so that the weight of the device and the nonlinearity of the scale spring 172 in response to compressive forces, e.g. the weight of the fish, is taken into account. For ease of handling, a hand rest 180 is placed about the exterior of handle 114 and a separate scale handle 182 is secured to the end of scale stem 168.

The combined fish scale and catch-and-release device in the catch-and-release mode operates as described in paragraphs 31 through 33 above. Before release of the fish and if the weight of the fish is to be ascertained, the user moves his hand from gripping handle 114 to gripping scale handle 182. The scale is now in use for the first time and the amount of compression of the scale spring is translated into the weight of the fish by viewing the calibrated markings 170 on the scale stem 168. The scale indicator is at 0 when the catch-and-release device is empty and no additional weight depends therefrom. When a fish is in the jaws of the device and the device is held by the scale handle 182, the scale spring 172 is compressed and the scale stem 168 extends from the handle exposing the marking corresponding to the weight of the fish. The independent acting of the catch-and-release device and of the fish scale, eliminates the shocking of the scale spring experienced in prior art devices.

In the previous discussion, the fish scale is shown as one using a compression spring, a movable scale, and a fixed indicator. It is understood that it is within the spirit of this invention to use a spring which is elongated when a weight is suspended therefrom and to use a moving indicator against a fixed scale or combinations thereof.

The invention disclosed hereby is presented as a unique crank mechanism wherein the self-locking crank arm at one end of its travel locks against the interior wall of the device and is held there released. Thus, the appended claims are to be interpreted broadly, as it is understood that slight variations can be made in the device without departing from the spirit of this invention.

What is claimed is:

1. A combined fish scale and catch-and-release device, said device for weighing a fish and for holding the lip of a fish while removing the fishhook from the fish, said device comprising, in combination:

an elongated body having a longitudinal axis therethrough, said elongated body, in turn, comprising:
a catch-and-release handle at one end thereof;
a central bore coaxial with said longitudinal axis, said central bore being open at both ends;
a fixed pivot in said end of said bore opposite said catch-and-release handle;
a pair of C-shaped jaws, each attached at one end thereof to said fixed pivot and rotatable thereabout between a closed position with the unattached end of said jaws meeting and an open position for accepting the lip of a fish;
a crank and slider assembly in said central bore and attached at one end to said pair of C-shaped jaws, said crank and slider assembly opening said C-shaped jaws upon forward movement and locking said C-shaped jaws upon rearward movement, and, when aligned with the longitudinal axis of said elongated body defining a null position;
said crank and slider assembly, when beyond the null position in one direction transmitting the spring force against opening of the device, and, when beyond the null position in the other direction, transmitting the spring force toward locking of the device;
a fish scale mounted in said catch-and-release handle, in turn, comprising:
a scale with markings in units of weight;
a scale stem attached to said catch-and-release handle;
a scale spring mounted about said scale stem and having a length proportional to the weight depending therefrom; and,
an indicator arrayed against said scale translating said length of said scale spring into weight.

2. A combined fish scale and catch-and-release device as described in claim 1 wherein said scale stem depends into and extends from said catch-and-release handle and said fish scale further comprises:
a scale handle attached to the end of said scale stem extending from said catch-and-release handle and adjacent thereto, said scale handle adapting said combined fish scale and catch-and-release device for alternately operating in a weighing mode and a holding-the-lip-of-a-fish mode without the operator touching the fish.

3. A combined fish scale and catch-and-release device as described in claim 2 wherein said scale spring is compressed when an item being weighed depends therefrom, and wherein said indicator is a cap threadingly engaging said catch-and-release handle and engaging one end of said scale spring.

4. A combined fish scale and catch-and-release device as described in claim 3 wherein said scale stem has said scale thereon and, upon weighing an item, said scale stem extends from the catch-and-release handle exposing the marking thereon corresponding to the weight.

5. A combined fish scale and catch-and-release device as described in claim 3 wherein said markings on said scale stem are calibrated to compensate for the weight of said catch-and-release device.

6. A combined fish scale and catch-and-release device as described in claim 3 wherein said markings on said scale stem are calibrated to compensate for any nonlinearity during compression of said scale spring.

7. A combined fish scale and catch-and-release device as described in claim 2 wherein said scale spring is elongated when an item being weighed depends therefrom, and wherein said indicator is arrayed against said scale to indicate the weight.

8. A combined fish scale and catch-and-release device as described in claim 7 wherein said scale is fixed and the indicator moves therealong to indicate the weight.

9. A combined fish scale and catch-and-release device as described in claim 1 wherein said device further comprises:
a plug inserted into and closing said central bore, said plug having two sides and defining a scale housing on one side thereof and a crank and slider assembly housing on the other side thereof.

10. A combined fish scale and catch-and-release device operable in a fish scale mode and in a catch-and-release mode, said device comprising, in combination:
an elongated body having two ends and having a longitudinal axis therethrough;
a central bore coaxial with said longitudinal axis, said central bore extending throughout said elongated body;
a crank and slider assembly mounted in said central bore at one end of said elongated body, said crank and slider assembly adapted to reciprocally operate C-shaped jaws of a catch-and-release device between an open and a closed position;
a catch-and-release handle portion of said elongated body adjacent to said crank and slider assembly and extending to the other end of said elongated body, said catch-and-release handle having a chamber therewithin;
said crank and slider assembly has a null position between said open position and said closed position, and, when beyond the null position in one direction transmitting a spring force against opening of the device, and, when beyond the null position in the other direction, transmitting a spring force toward locking of the device; and,
a fish scale mounted in said catch-and-release handle portion
adapting said combined fish scale and catch-and-release device for alternately operating in said fish scale mode and said catch-and-release mode without the operator touching the fish.

11. A combined fish scale and catch-and-release device as described in claim 10 wherein said fish scale comprises:
a scale stem depending into and extending from said catch-and-release handle; and,
a scale handle attached to the end of said scale stem extending from said elongated body and adjacent thereto.

12. A combined fish scale and catch-and-release device as described in claim 11 wherein said fish scale further comprises:
a scale with markings in units of weight; and,
a scale spring mounted about said scale stem, said scale spring having a length proportional to the weight depending therefrom.

13. A combined fish scale and catch-and-release device as described in claim 12 wherein said scale spring is compressed when an item being weighed depends therefrom, and wherein said indicator is a cap threadingly engaging said catch-and-release handle and engaging one end of said scale spring.

14. A combined fish scale and catch-and-release device as described in claim 13 wherein said scale stem has said scale thereon and, upon weighing an item, said scale stem extends from the catch-and-release handle exposing the marking thereon corresponding to the weight.

15. A combined fish scale and catch-and-release device as described in claim 13 wherein said markings on said scale stem are calibrated to compensate for the weight of said catch-and-release device.

16. A combined fish scale and catch-and-release device as described in claim 13 wherein said markings on said scale stem are calibrated to compensate for any nonlinearity during compression of said scale spring.

17. A combined fish scale and catch-and-release device as described in claim 12 wherein said scale spring is elongated when an item being weighed depends therefrom, and wherein said indicator is arrayed against said scale to indicate the weight.

18. A combined fish scale and catch-and-release device as described in claim 17 wherein said scale is fixed and the indicator moves therealong to indicate the weight.

19. A combined fish scale and catch-and-release device as described in claim 18 wherein said markings on said scale stem are calibrated to compensate for the weight of said catch-and-release device.

20. A combined fish scale and catch-and-release device as described in claim 10 wherein said device further comprise:
   a plug inserted into and closing said central bore, said plug having two sides and defining a scale housing on one side thereof and a crank and slider assembly housing on the other side thereof.

* * * * *